US011839584B2

(12) United States Patent
Hanson et al.

(10) Patent No.: US 11,839,584 B2
(45) Date of Patent: Dec. 12, 2023

(54) MODULAR MOBILITY SYSTEMS

(71) Applicant: Participant Assistive Products, San Francisco, CA (US)

(72) Inventors: Wayne H. Hanson, Bozeman, MT (US); George J. King, San Francisco, CA (US); David E. Calver, Courtenay (CA); Ryota Yamada, Aichi-ken (JP); Fahad I. Aldaajani, Bozeman, MT (US)

(73) Assignee: Participant Assistive Products, San Francisco, CA (US)

( * ) Notice: Subject to any disclaimer, the term of this patent is extended or adjusted under 35 U.S.C. 154(b) by 305 days.

(21) Appl. No.: 16/729,110

(22) Filed: Dec. 27, 2019

(65) Prior Publication Data

US 2020/0206067 A1 Jul. 2, 2020

Related U.S. Application Data

(60) Provisional application No. 62/785,743, filed on Dec. 28, 2018.

(51) Int. Cl.
*B62B 7/06* (2006.01)
*A61G 5/14* (2006.01)
(Continued)

(52) U.S. Cl.
CPC ............. *A61H 3/04* (2013.01); *A61G 5/1062* (2013.01); *A61G 5/1067* (2013.01);
(Continued)

(58) Field of Classification Search
CPC ................ A61H 3/04; A61H 2003/004; A61H 2201/1652; A61H 2201/0107; B62B 7/12;
(Continued)

(56) References Cited

U.S. PATENT DOCUMENTS 3,788,695 A * 1/1974 Salem .................. A61G 5/1094 297/6
4,165,127 A * 8/1979 Vago ......................... A61G 5/00 280/87.021
(Continued)

FOREIGN PATENT DOCUMENTS

DE 19952838 A1 * 5/2001 ........... A61G 5/1062
DE 202008009608 U1 * 10/2008 ............... A61G 5/08
(Continued)

OTHER PUBLICATIONS

International Search Report and Written Opinion dated May 5, 2020, directed to International Application No. PCT/US19/68770; 14 pages.
(Continued)

*Primary Examiner* — Steve Clemmons
(74) *Attorney, Agent, or Firm* — MORRISON & FOERSTER LLP

(57) ABSTRACT

Provided are modular mobility systems that can be used as gait trainers, wheelchairs, and/or standing aids. Modular mobility systems provided comprise a mobility base, a gait trainer module, a wheelchair module, and/or a standing aid module. Modular mobility systems provided herein are designed to adjust to users of different sizes and of different abilities and/or needs.

31 Claims, 8 Drawing Sheets

(51) Int. Cl.
*A61G 5/10* (2006.01)
*A61H 3/00* (2006.01)
*A61H 3/04* (2006.01)
*A61G 5/12* (2006.01)

(52) U.S. Cl.
CPC ............ *A61G 5/1094* (2016.11); *A61G 5/128* (2016.11); *A61G 5/14* (2013.01); *A61H 2003/007* (2013.01); *A61H 2201/0107* (2013.01); *A61H 2201/1635* (2013.01)

(58) Field of Classification Search
CPC ........... B62B 7/14; B62B 7/142; B62B 7/145; A61G 5/1075
See application file for complete search history.

(56) References Cited

U.S. PATENT DOCUMENTS 4,351,540 A * 9/1982 Minnebraker ....... A61G 5/1054 411/21
4,358,125 A * 11/1982 Charles .................. A61G 5/128 297/411.27
4,405,142 A * 9/1983 Whetstine ............ A61G 5/1075 411/21
4,598,921 A * 7/1986 Fenwick .............. A61G 5/1083 180/907
4,676,519 A * 6/1987 Meier ...................... A61G 5/12 280/649
4,805,931 A * 2/1989 Slasor ...................... A61G 5/08 280/647
5,174,590 A * 12/1992 Kerley ................... A61H 3/008 280/1.5
5,275,426 A * 1/1994 Tankersley ............. A61H 3/008 135/67
5,366,036 A * 11/1994 Perry ...................... B60L 50/66 180/65.1
5,538,268 A * 7/1996 Miller ...................... A61H 3/04 280/87.041
5,588,456 A * 12/1996 Hart ......................... A61H 3/04 135/67
5,884,935 A * 3/1999 Tholkes ................... A61G 5/14 280/657
6,003,532 A 12/1999 Pi
6,032,975 A * 3/2000 Hanson .................... A61G 5/00 280/250.1
6,086,086 A * 7/2000 Hanson ................ A61G 5/0891 280/650
6,139,037 A * 10/2000 Papac ................. B60B 33/0068 280/250.1
6,270,111 B1 8/2001 Hanson et al.
6,340,168 B1 * 1/2002 Woleen ................ A61G 5/0833 280/33.996
6,623,022 B2 * 9/2003 Malassigne ............ A61G 5/125 280/250.1
6,715,783 B1 * 4/2004 Hanson ..................... B62B 7/10 280/47.38
6,832,770 B1 * 12/2004 Wright-Ott ............ A47D 13/04 135/65
7,014,204 B2 * 3/2006 Meyers .................... A61G 5/12 280/47.41
7,021,640 B2 * 4/2006 Knopf ...................... A61G 5/08 280/43
7,455,362 B2 * 11/2008 Hanson .................... A61G 5/10 297/320
7,658,448 B2 * 2/2010 Birk ....................... A47C 1/025 297/452.4
7,921,953 B2 * 4/2011 Irvine .................... A61G 5/127 180/208
8,123,664 B2 * 2/2012 Lokken ............. A63B 71/0009 482/142
8,663,136 B1 * 3/2014 Alsaffar ................... A61H 3/04 601/35
8,720,914 B1 * 5/2014 Heath ...................... A61H 3/04 280/87.021
8,985,618 B2 * 3/2015 Perk ......................... A61G 5/08 280/647
9,510,985 B2 * 12/2016 Maither ................. A61G 5/128
9,655,806 B2 * 5/2017 Naucke ................ A61G 5/1008
9,662,264 B2 * 5/2017 Jacobs ..................... A61H 3/04
9,849,048 B2 * 12/2017 Borisoff ............... A61H 1/0244
9,962,303 B1 * 5/2018 Wilson ................. A61G 5/1054
10,182,956 B2 * 1/2019 Stryker .............. A61N 1/36003
10,245,204 B2 * 4/2019 Sandler .................. A61H 1/024
2003/0137119 A1 7/2003 Razon
2005/0029855 A1 * 2/2005 Hanson ................ A61G 5/0891 297/440.15
2006/0048785 A1 * 3/2006 Dalen .................. A61G 5/1091 128/845
2008/0079230 A1 4/2008 Graham
2010/0013276 A1 1/2010 Tholkes et al.
2013/0037333 A1 2/2013 Sousa
2013/0168931 A1 * 7/2013 Baraitaru ................. A61G 5/08 280/30
2015/0283009 A1 10/2015 Borisoff et al.
2019/0247697 A1 * 8/2019 Park ...................... A61H 1/0237
2019/0282427 A1 * 9/2019 Nam ......................... A61H 3/04

FOREIGN PATENT DOCUMENTS

DE 102009050734 A1 * 4/2011 ............... A61H 3/04
DE 102015202926 A1 * 8/2016
EP 2921151 A1 * 9/2015 ............... A61H 3/04
GB 2547109 A * 8/2017 ............... A61H 3/04
JP 2000288031 A * 10/2000
KR 20120097783 A * 9/2012
WO WO-2013147601 A1 * 10/2013 ........... A61G 5/1059
WO WO-2019071197 A1 * 4/2019 ............... A61H 1/00

OTHER PUBLICATIONS

Invitation to Pay Additional Fees dated Mar. 3, 2020, directed to International Application No. PCT/US19/68770; 2 pages.

* cited by examiner

1400

MODULAR MOBILITY SYSTEMS

CROSS-REFERENCE TO RELATED APPLICATIONS

This application claims the benefit of U.S. Provisional Application No. 62/785,743, filed Dec. 28, 2018, the entire contents of which are incorporated herein by reference.

FIELD OF THE DISCLOSURE

This disclosure relates to mobility systems, and, more particularly, to modular mobility systems that can be used as a gait trainer, a wheelchair, and/or a standing aid, depending on the needs of the user.

BACKGROUND OF THE DISCLOSURE

Medical devices, and particularly mobility devices, have been developed to help people of various abilities go about their daily lives despite any disability or injury they may have. For example, mobility systems such as wheelchairs, gait trainers, and standing aids can help users that have physical and mobility restrictions. In particular, wheelchairs can be used for people who have difficulties walking. A gait trainer may be used to assist a user who needs some assistance walking. Standing aids can help integrate a user who is unable to stand on his or her own into mainstream classroom, leisure, and other activities by positioning the user in a standing position.

SUMMARY OF THE DISCLOSURE

Provided are modular mobility systems that can be used as gait trainers, wheelchairs, and/or standing aids. Unlike conventional gait trainers, wheelchairs, and standing aids, which are separate and distinct systems, the modular mobility systems provided herein may be modified from one use (i.e., gait trainer, wheelchair, or standing aid) to another use with a simple interchanging of parts.

Further, modular mobility systems provided herein are also designed to adjust to users of different sizes and of different abilities and/or needs. Accordingly, the modular mobility systems disclosed herein provide far more adjustability and versatility than any conventional mobility system.

In some embodiments, a modular mobility system is provided, the modular mobility system comprising: a mobility base; and a gait trainer module removably coupled to the mobility base.

In some embodiments of the modular mobility system, the modular mobility system comprises a wheelchair module configured to removably couple to the mobility base.

In some embodiments of the modular mobility system, the modular mobility system comprises a standing aid module configured to removably couple to the mobility base In some embodiments of the modular mobility system, the mobility base comprises four wheels.

In some embodiments of the modular mobility system, the mobility base comprises three wheels.

In some embodiments of the modular mobility system, the mobility base comprises an interface plate configured to receive the gait trainer at any one of a plurality of angles.

In some embodiments of the modular mobility system, the gait trainer module comprises a telescoping tubular support configured to adjust for a height of a user.

In some embodiments of the modular mobility system, the gait trainer module comprises a handle bar configured to adjust forward and backward.

In some embodiments of the modular mobility system, the gait trainer module comprises a harness configured to support a user in a standing position.

In some embodiments, provided is a modular mobility system, the modular mobility system comprising: a mobility base; and a wheelchair module removably coupled to the mobility base.

In some embodiments of the modular mobility system, the modular mobility system comprises a gait trainer module configured to removably couple to the mobility base.

In some embodiments of the modular mobility system, the modular mobility system comprises a standing aid module configured to removably couple to the mobility base In some embodiments of the modular mobility system, the mobility base comprises four wheels.

In some embodiments of the modular mobility system, the mobility base comprises three wheels.

In some embodiments of the modular mobility system, the mobility base comprises an interface plate configured to receive the wheelchair module at any one of a plurality of angles.

In some embodiments of the modular mobility system, the wheelchair module comprises a side plates along a seat to adjust to a user.

In some embodiments of the modular mobility system, the wheelchair module comprises side plates along a back support to adjust for a user.

In some embodiments of the modular mobility system, the wheelchair module comprises a handle bar configured to adjust for a height of a user.

In some embodiments of the modular mobility system, the wheelchair module comprises an adjustable foot rest.

In some embodiments of the modular mobility system, the adjustable foot rest is configured to adjust for a length of a user's legs.

In some embodiments of the modular mobility system, the adjustable foot rest is configured to pivot at a point where a foot rest tubular support is coupled to a frame of the wheelchair module.

In some embodiments, a modular mobility system is provided, the modular mobility system comprising: a mobility base; and a standing aid module removably coupled to the mobility base.

In some embodiments or the modular mobility system, the modular mobility system comprises a gait trainer module configured to removably couple to the mobility base.

In some embodiments of the modular mobility system, the modular mobility system comprises a wheelchair module configured to removably couple to the mobility base In some embodiments of the modular mobility system, the mobility base comprises four wheels.

In some embodiments of the modular mobility system, the mobility base comprises three wheels.

In some embodiments of the modular mobility system, the mobility base comprises an interface plate configured to receive the standing aid module at any one of a plurality of angles.

In some embodiments of the modular mobility system, the standing aid module comprises a body support and a head rest coupled to a frame.

In some embodiments of the modular mobility system, the standing aid module comprises a tray holder coupled to a frame, wherein the tray holder is configured to adjust telescopically away from and towards the frame, and wherein the tray holder is configured to pivot relative to a location at which the tray holder is coupled to the frame.

In some embodiments of the modular mobility system, the modular mobility system comprises a tray removably coupled to the tray holder.

In some embodiments of the modular mobility system, the standing aid module comprises an adjustable foot rest.

In some embodiments of the modular mobility system, the adjustable foot rest is configured to adjust for a length of a user's legs.

In some embodiments of the modular mobility system, the adjustable foot rest is configured to pivot at a point where a foot rest tubular support is coupled to a frame of the standing aid module.

BRIEF DESCRIPTION OF THE FIGURES

The invention will now be described, by way of example only, with reference to the accompanying drawings, in which.

DETAILED DESCRIPTION OF THE DISCLOSURE

Provided are modular mobility systems that can be used as gait trainers, wheelchairs, and/or standing aids. The modular mobility systems provided herein include a mobility base. The mobility base provides the basic structure and support of the modular mobility device. The mobility device, on its own, does not achieve one of the gait trainer, wheelchair, or standing aid. However, one of three modules—a gait trainer module, a wheelchair module, and/or a standing aid module—may be coupled to the mobility base to achieve a gait trainer mobility system, a wheelchair mobility system, or a standing aid mobility system, respectively.

Described below is a detailed description of each of the components of the modular mobility systems provided herein. In particular, provided below are descriptions of a mobility base, a gait trainer module, a wheelchair module, and a standing aid module.

Mobility Base

Modular mobility systems provided herein each include a mobility base. Regardless of whether a particular mobility system serves as a gait trainer, as a wheelchair, or as a standing aid, the mobility base is the central frame of the system.

Figure 1:
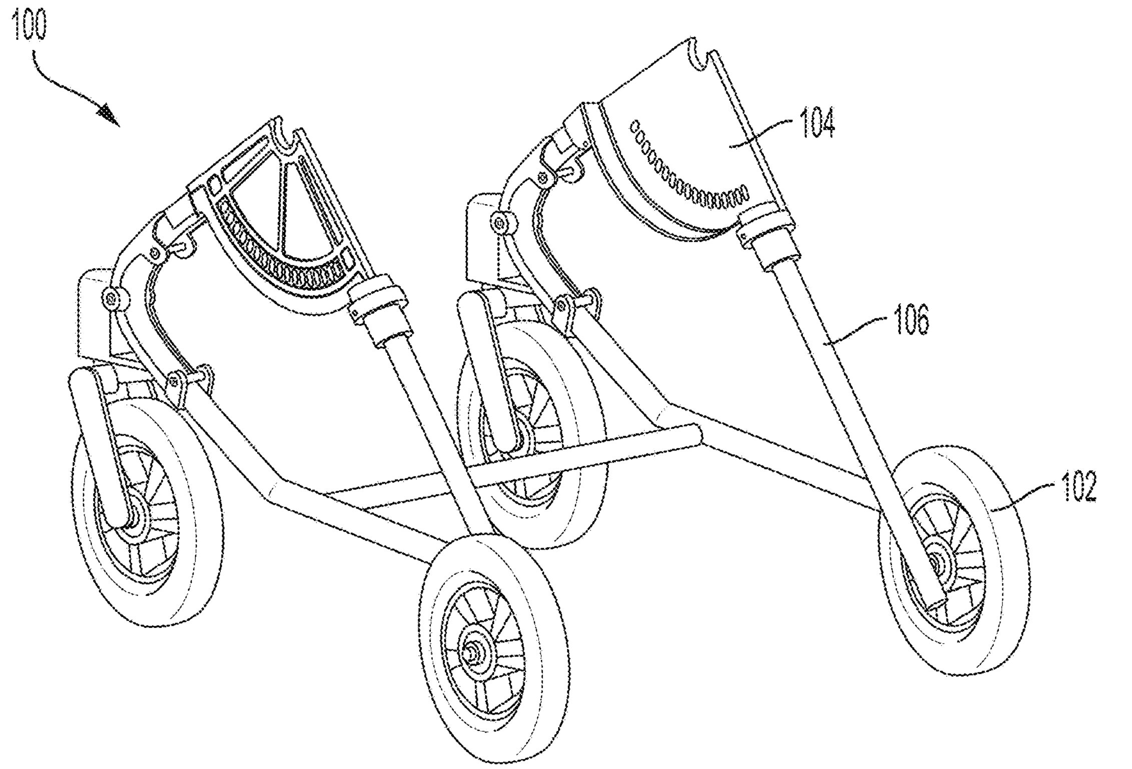
FIG. 1 shows a mobility base, according to some embodiments.

FIG. 1 shows a mobility base 100 according to some embodiments. As shown, the mobility base 100 includes wheels 102, interface plate 104, and tubular frame 106.

Interface plate 104 may be configured to receive the various modules and secure them in place on mobility base 100. In some embodiments, interface plate 104 may be configured to position the various modules in a variety of positions. By allowing the modules to be coupled to mobility base 100 via interface plate 104 in a variety of positions, the modular mobility system can be customizable for each individual user based on the user's size (e.g., height) and needs. Interface plate 104 is described in more detail below with reference to FIG. 2.

As shown, mobility base 100 includes four wheels. However, mobility base could reasonably include any number of wheels. Additionally, tubular frame 106 may be made of any material suitable for supporting the weight of a human. In some embodiments, a strong, yet lightweight material may be chosen for tubular frame 106. Tubular frame 106 may include a folding mechanism to allow the mobility base, and an entire mobility system when configured as such, to fold into a compact and/or portable configuration. In some embodiments, tubular frame 106 may comprise an X-brace folding mechanism. By having a folding mechanism, mobility systems provided herein can improve the lives of users by allowing them to travel and transport their mobility systems as easily as possible.

Further, mobility base 100 is shown in FIG. 1 with two relatively small wheels, and two relatively large wheels. In some embodiments, the two relatively small wheels may be positioned forward, such that they are the leading wheels when the mobility system is propelled forward. In some embodiments, the relatively large wheels may be positioned forward, such that they are the leading wheels when the mobility system is propelled forward. Determining whether the relatively large wheels or the relatively small wheels are positioned forward can be dependent upon whether the user is using the mobility system independently, or if a caregiver is mobilizing the user with the mobility system. In some embodiments, two or more wheel may be casters. In some embodiments, all wheels may be the same size. In some embodiments, mobility base 100 may be configured with three wheels. In some embodiments, to convert between three and four wheels, the attached wheels are removed (without tools) by pushing a button or "quick release" on the center wheel axle. In some embodiments, the wheel lock (brake) needs to be reset so that it functions for the new wheel.

Figure 2:
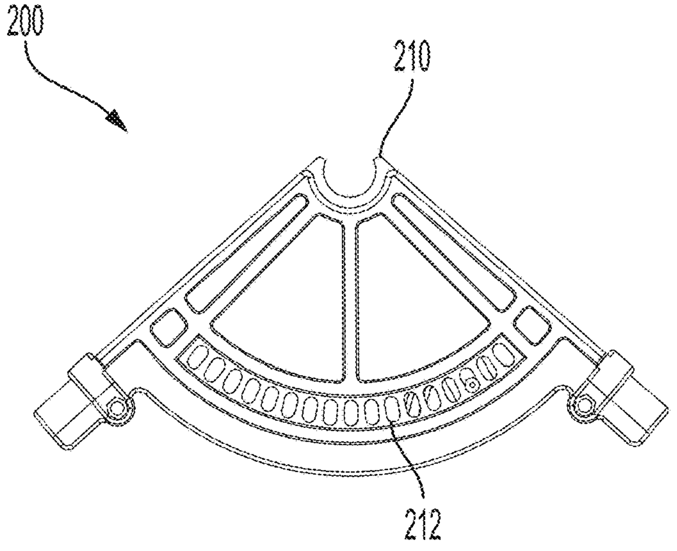
FIG. 2 shows an interface plate, according to some embodiments.

FIG. 2 shows interface plate 200 according to some embodiments. As described above, interface plate 200 is a part of a mobility base (e.g., mobility base 100 of FIG. 100). More specifically, interface plate 200 is positioned above a tubular frame (e.g., tubular frame 106 of FIG. 1). Interface plate 200 allows for any of the three modules (i.e., gait trainer module, wheelchair module, and/or standing aid module) to be coupled to the mobility base to form a complete, functional mobility system. Further, interface plate 200 allows for each of the three modules to couple to a mobility base in a customizable or adjustable manner.

As shown in FIG. 2, interface plate comprises top pivot cup 210 and index holes 212. Top pivot cup 210 is configured to receive an upper cross tube of a module (i.e., a gait trainer module, a wheelchair module, and/or a standing aid module) such that the combined module-and-mobility base configuration achieves a complete and operational mobility system. Index holes 212 are configured to receive an angular adjustment release of a module. In some embodiments, interface plate 200 may have a center-of-gravity tilt-in-place system that can allow pivot cup 210 to be positioned with the user's center of gravity. Once pivot cup 210 is aligned as desired, a module can be coupled to pivot cup 210 and mobility base to achieve a mobility system.

Gait Trainer Module

A gait trainer module is one of numerous types of interchangeable modules that may be configured to couple to a mobility base to achieve a mobility system. A gait trainer in particular may be designed to help a user walk safely and efficiently.

Figure 3:
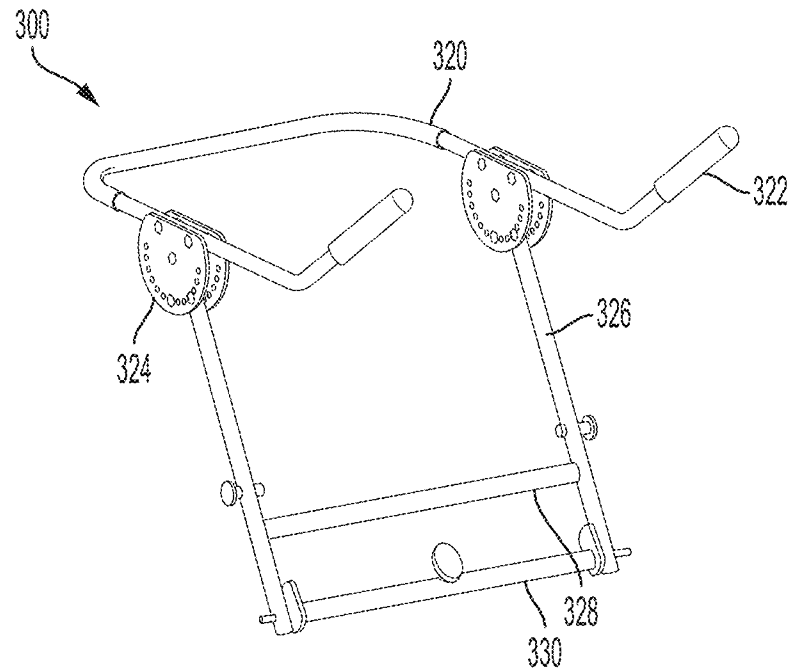
FIG. 3 shows a gait trainer module, according to some embodiments.

FIG. 3 shows a gait trainer module 300 according to some embodiments. As shown in the Figure, gait trainer module 300 can include a handle bar 320 comprising two handle grips 322, a multi-adjustment plate 324, a telescoping tubular support 326, an upper cross tube 328, and an angular adjustment release 330.

Handle bar 320 comprising handle grips 322 can provide support for a user to hold onto the gait trainer module 300 for support. Multi-adjustment plate 324 allows for a customized fit. As shown, multi-adjustment plate 324 comprises a plurality of index holes arced along a bottom edge of multi-adjustment plate 324. The angle at which telescoping tubular support 326 is positioned in place relative to handle bar 320 is determined by which index hole of the plurality of index holes the telescoping tubular support 326 is coupled to. Telescoping tubular support 326 may be pivoted at various angles relative to handle bar 320 to achieve a gait trainer mobility system of various sizes and shapes for users of various sizes, shapes, and needs. Further, the telescoping tubular support 326 is configured to adjust telescopically, to account for users of various heights.

Upper cross tube 328 and angular adjustment release 330 are both configured to snap into place at an interface plate of a mobility base. This configuration is described in more detail with respect to FIG. 4, below.

Figure 4:
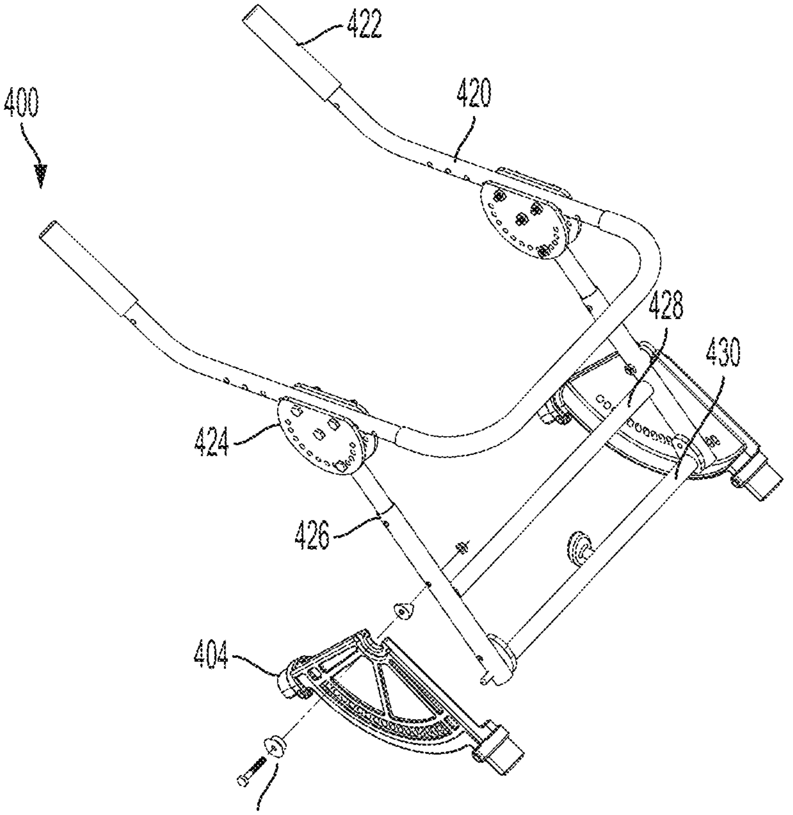
FIG. 4 shows a gait trainer module and interface plate, according to some embodiments.

FIG. 4 shows a gait trainer module 400 aligned with interface plate 404, according to some embodiments. As shown in the Figure, gait trainer module 400 includes a handle bar 420 comprising two handle grips 422, a multi-adjustment plate 424, a telescoping tubular support 426, an upper cross tube 428, and an angular adjustment release 430. The Figure also shows interface plate 404.

In some embodiments, upper cross tube 428 and angular adjustment release 430 are configured to snap into place at interface plate 404 of a mobility base. In particular, each end of upper cross tube 428 is configured to be positioned at a top pivot cup of an interface plate 404. Angle adjustment release 430 is configured to be pivoted (relative to upper cross tube 428 at the top pivot cup) to adjust and customize the size and shape of the gait trainer mobility system. Specifically, each end of angle adjustment release 430 is configured to snap into an index hole of the plurality of index holes located on interface plate 404. In some embodiments, gait trainer module 400 is configured such that it is suspended by and pivots on one or more trunnions 432. As shown in the Figure, trunnions may be attached to the telescoping tubular supports 426 independently of upper cross tube 428.

Figure 5:
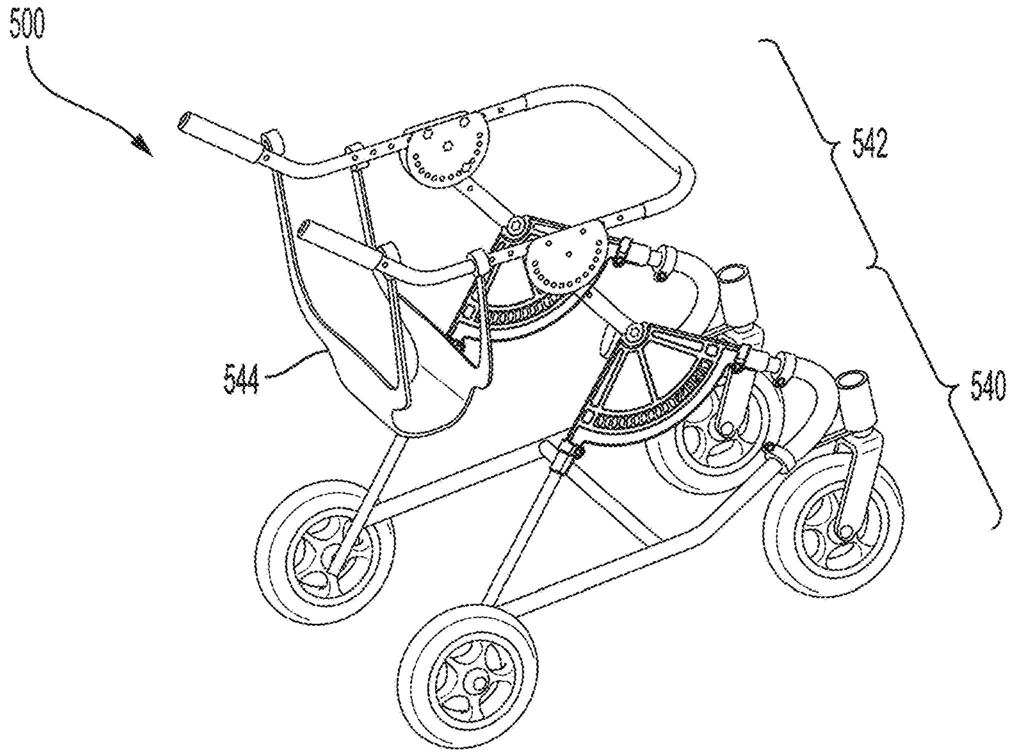
FIG. 5 shows a gait trainer mobility system, according to some embodiments.

In some embodiments, a gait trainer module may comprise a harness. A harness may be used as weight-bearing support for a user. For example, FIG. 5 shows a gait trainer mobility system 500 comprising mobility base 540, gait trainer module 542, and harness 544. For users who need extra support, harness 544 may be used to help hold the user in a standing position. In some embodiments, harness 544 may be used as a seat for a user. In some embodiments, a user's legs may be inserted into either space created by the handle bar of the gait trainer module and harness 544.

Figure 6:
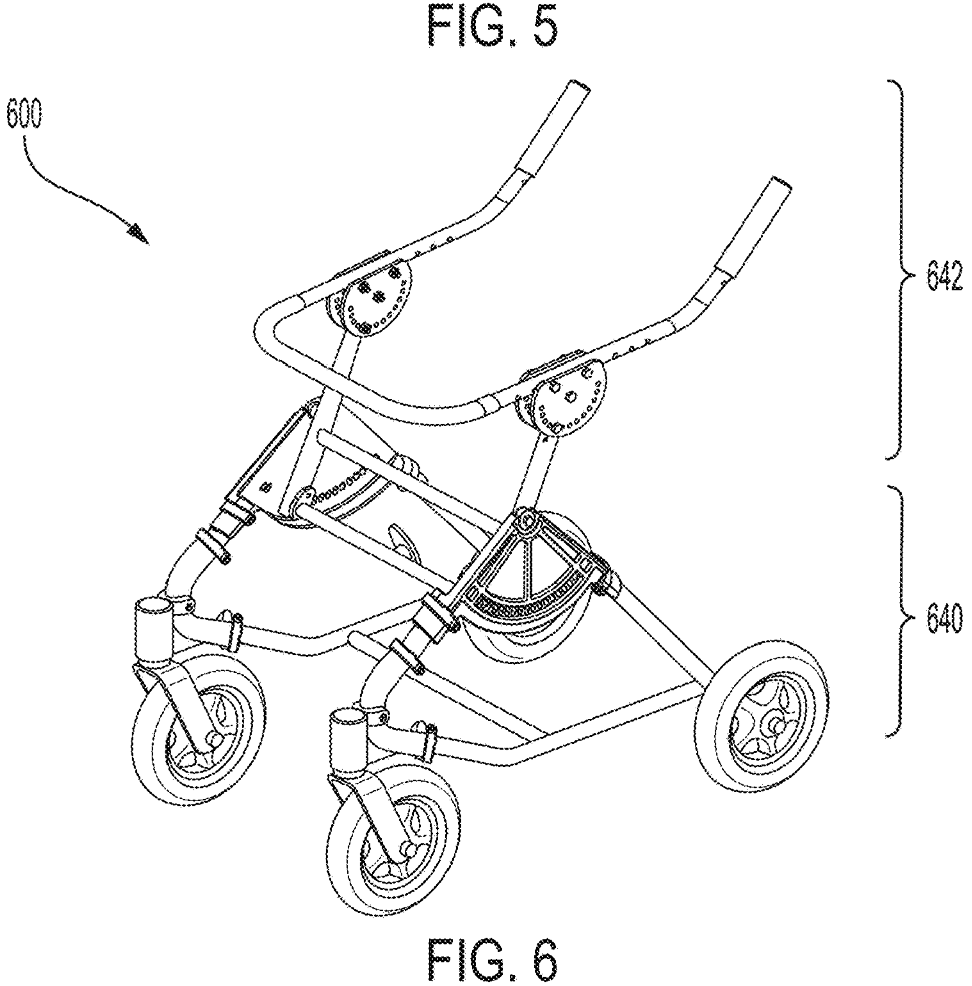
FIG. 6 shows a gait trainer mobility system, according to some embodiments.

FIG. 6 shows a complete and functional gait trainer mobility system 600. As shown, gait trainer mobility system 600 comprises mobility base 640 and gait trainer module 642. Gait trainer module 642 is coupled to mobility base 640 at the interface plates of mobility base 640.

Figure 7:
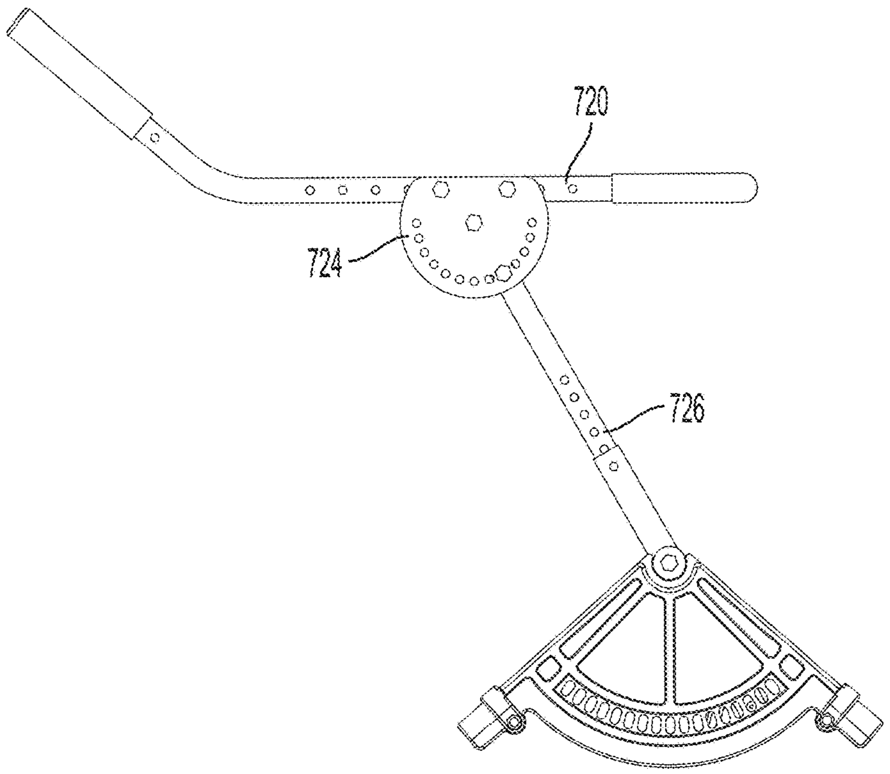
FIG. 7 shows a side view of a gait trainer module and interface plate, according to some embodiments.
Figure 8:
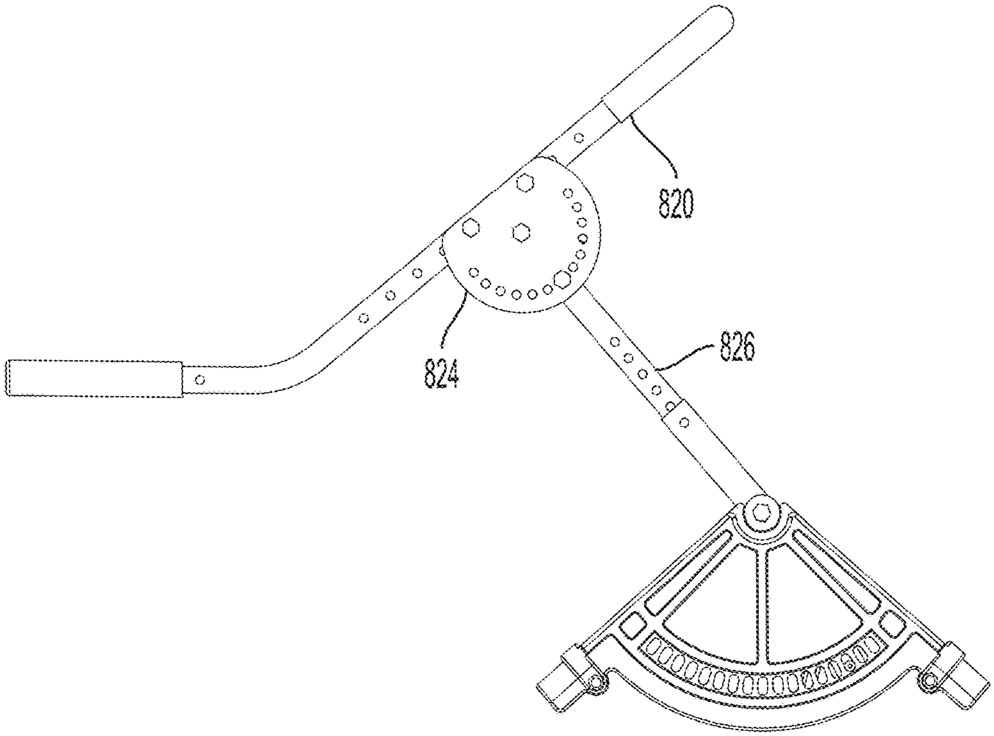
FIG. 8 shows a side view of a gait trainer module and interface plate, according to some embodiments.

FIG. 7 shows a side view of a gait trainer module and interface plate. Handle bar 720 is configured to adjust in a lateral direction along multi-adjustment plate 724 to adjust to users of different shapes, sizes, and needs. Telescoping tubular support 726 is configured to telescope up and down to accommodate users of different shapes, sizes, and needs. Additionally, telescoping tubular support 726 is configured to pivot at multi-adjustment plate 724 to accommodate users of different shapes, sizes, and needs. For example, FIG. 8 also shows a side view of a gait trainer module and interface plate according to some embodiments. However, as compared to telescoping tubular support 726 of FIG. 7, telescoping tubular support 826 of FIG. 8 is positioned at multi-adjustment plate 824 such that telescoping tubular support 826 is perpendicular to handle bar 820. Accordingly, the differences between FIGS. 7 and 8 provide an example of the adjustability provided in the gait trainer modules disclosed herein for module mobility systems.

Figure 9:
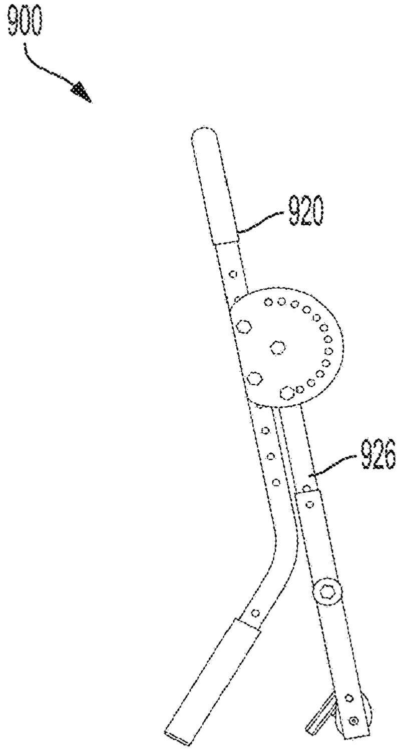
FIG. 9 shows a side view of a gait trainer module and interface plate, according to some embodiments.

The multi-adjustment plate of a gait trainer module may also be used to collapse the gait trainer module into a compact and portable configuration. For example, FIG. 9 shows gait trainer module 900 in a collapsed configuration. As shown, handle bar 920 has been adjusted to a near-vertical position such that it is stacked against telescoping tubular support 926. This allows gait trainer module 900 to be easily transported which can allow a user to integrate into classroom, leisure, and other activities more readily.

Wheelchair Module

A wheelchair module is another example of an interchangeable module that may be configured to couple to a mobility base to achieve a mobility system. A wheelchair in particular may be designed to help a user move around when walking is not an option.

Figure 10:
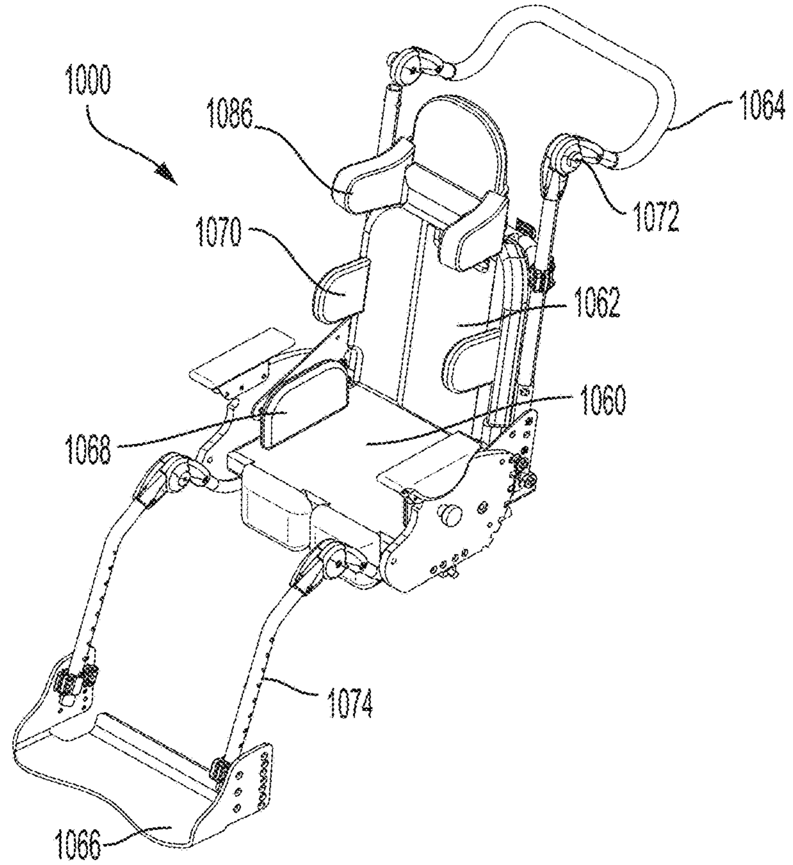
FIG. 10 shows a wheelchair module, according to some embodiments.

FIG. 10 shows a wheelchair module 1000 according to some embodiments. Like the gait trainer module described previously, wheelchair module 1000 is configured to couple to a mobility base (e.g., mobility base 100 of FIG. 1) to achieve a complete and functional mobility system. As shown in the Figure, wheelchair module 1000 may include a seat 1060, a back support 1062, a handle bar 1064, and a foot support 1066.

Seat 1060 may be adjustable for users of different sizes, shapes, and needs. For example, seat 1060 may adjust by extending or retracting forward or backward relative to a fixed bottom plate to accommodate different upper leg lengths.

Additionally, back support 1062 may be able to be reclined. Back support 1062 may also include side plates 1070 that can be adjusted according to a user's size and needs. In some embodiments, back support 1062 may be adjusted by moving up or down along the back frame tubes to accommodate different torso lengths.

Handle bar 1064 may be adjustable according to the size and shape of a caretaker, or another operating the wheelchair. For example, handle bar 1064 may be able to pivot at pivot point 1072 to adjust the handle bar up or down, depending on a caretaker's height and preferences.

Foot support 1066 may also be adjustable based on a user's leg length. For example, tubular supports 1074 comprise a plurality of index holes. Foot support 1066 may be adjusted up or down tubular supports 1074 and coupled to any of the index holes to achieve a foot rest that comfortably supports the legs/feet of a user.

Head rest 1086 may be adjusted by moving and/or pivoting forward or backward relative to back support 1062. In some embodiments, side plates 1070 can adjust independently of each other. For example, trunk supports 1070 may adjust up or down and toward or away from the center line of seat 1060 to align with a user's hips and/or spine.

Figure 11:
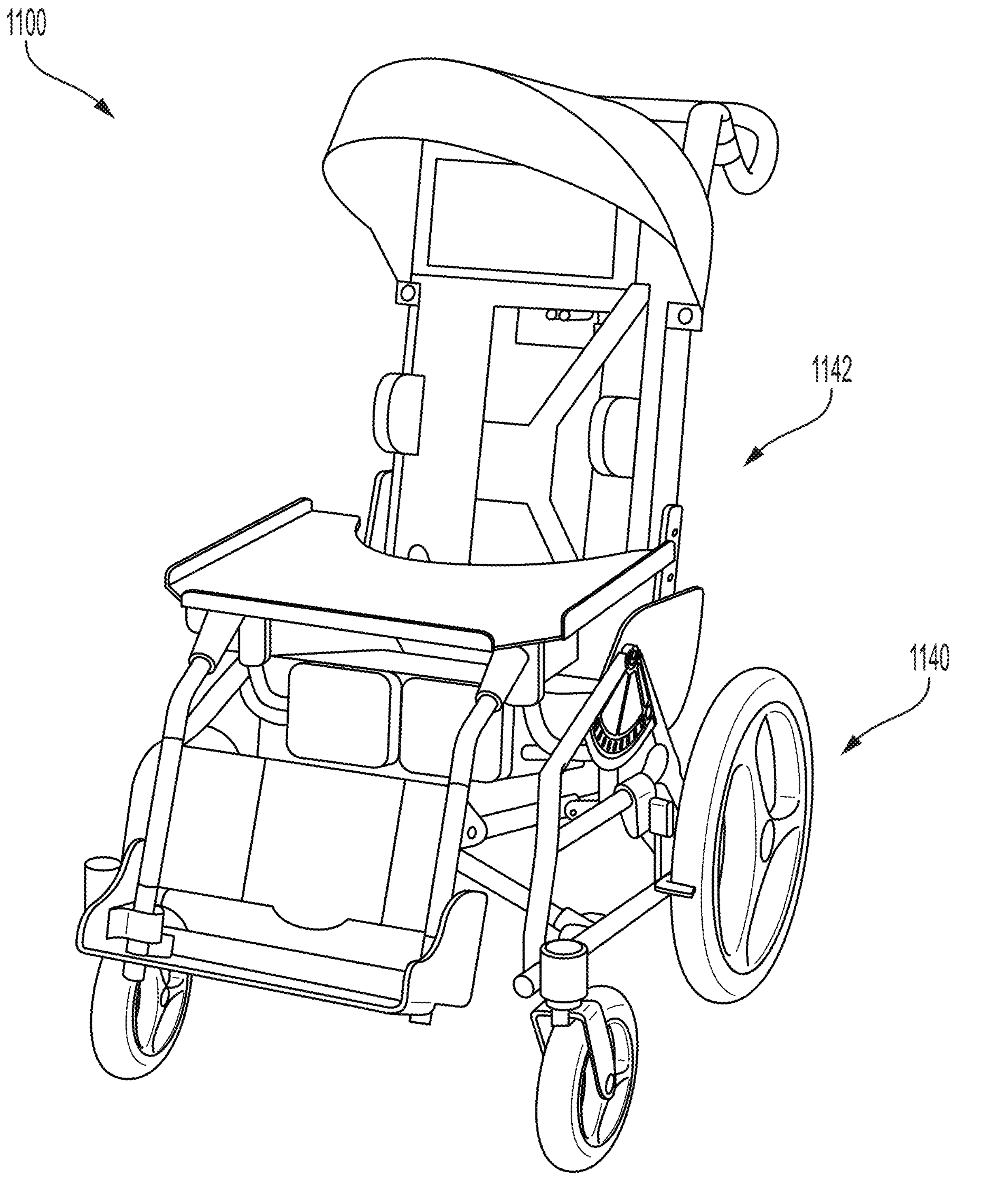
FIG. 11 shows a wheelchair mobility system, according to some embodiments.

FIG. 11 shows a wheelchair mobility system 1100 comprising a mobility base 1140 and wheelchair module 1142. Specifically, wheelchair mobility system 1100 is provided in a stroller configuration.

Standing Aid Module

A standing aid module is another example of an interchangeable module that may be configured to couple to a mobility base to achieve a mobility system. A standing aid module in particular may be designed to help support a user in a standing position for the purpose of social integration into a classroom, leisure, and other setting or for the purpose of achieving health benefits related to the standing position such as increased bone density, improved digestion, decreased risk of pressure ulcers, and improved circulation.

Figure 12:
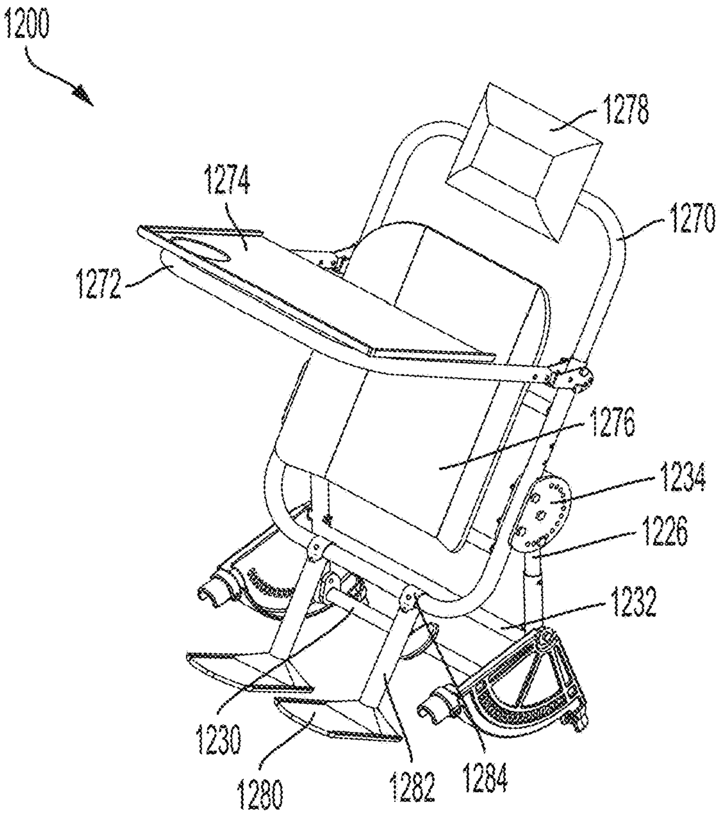
FIG. 12 shows a standing aid module, according to some embodiments.

FIG. 12 shows a standing aid module 1200 according to some embodiments. As shown, standing aid module 1200 includes angle adjustment release 1230, upper cross tube 1232, multi-adjustment plate 1234, telescoping tubular support 1226, frame 1270, tray holder 1272, tray 1274, body support 1276, head support 1278, foot rest 1280, foot support tube 1282, and foot rest angle adjustment 1284.

Angle adjustment release 1230, upper cross tube 1232, and multi-adjustment plate 1234 are analogous to angle adjustment release 430, upper cross tube 432, and multi-adjustment plate 1234 of gait trainer module 400 of FIG. 4. As described with respect to FIG. 4, each end of upper cross tube 1232 is configured to couple to a top pivot cup of an interface plate of a mobility base. Standing aid module 1200 is configured to pivot with respect to upper cross tube 1232 to adjust the angle of the standing aid module 1200 with respect to the mobility base. This can be useful for users of different sizes, shapes, and needs. In some embodiments, standing aid module 1200 is configured such that it is suspended by and pivots on one or more trunnions. In some embodiments, trunnions may be attached to the telescoping tubular supports 1226 independently of upper cross tube 1232.

Telescoping tubular support 1226 is also analogous to telescoping tubular support 426 of FIG. 4. Specifically, telescoping tubular support 1226 is configured to telescope up and down to adjust a height of the standing aid module 1200 with respect to the mobility base.

Frame 1270 is the main support of standing aid module 1200. In some embodiments, frame 1270 may comprise a lightweight yet strong material. Suitable materials may include aluminum or fiber-reinforced plastic (e.g., fiberglass or carbon fiber).

Standing aid module 1200 also includes the option of a tray holder 1272 and tray 1274. Tray holder 1272 may be tubular or hollow. In some embodiments, tray holder 1272 may be adjustable. For example, tray holder 1272 may be able to be pivoted up or down with respect to the coupling location of tray holder 1272 with frame 1270. In some embodiments, tray holder may be telescoping such that tray holder 1272 may be extend outwards from body support 1276, or inwards towards body support 1276. Tray 1274 is configured to couple to tray holder 1272. In some embodiments, tray holder 1272 may be removably coupled to tray holder 1272 to allow for easy cleaning and/or replacement.

Standing aid module 1200 may include body support 1276 and head support 1278. In some embodiments, body support 1276 and/or head support 1278 may be customized for a particular user. For example, the material, size, and shape may vary based on the size, shape, and needs of the user. Additionally, body support 1276 and head support 1278 may be adjusted vertically and/or horizontally with respect to frame 1270.

Foot rest 1280, foot support tube 1282, and foot rest angle adjustment 1284 all work together to provide proper foot and leg support for a user. Specifically, a user's feet can rest on foot rest 1280. In some embodiments, foot support tube 1282 may be telescoping such that the position of foot rest 1280 may be adjusted upwards or downwards to accommodate legs of various lengths. In some embodiments, foot rest 1280 may be adjusted using foot rest angle adjustment 1284 to pivot foot rest 1280 forwards or backwards to accommodate different user's needs and preferences.

Figure 13:
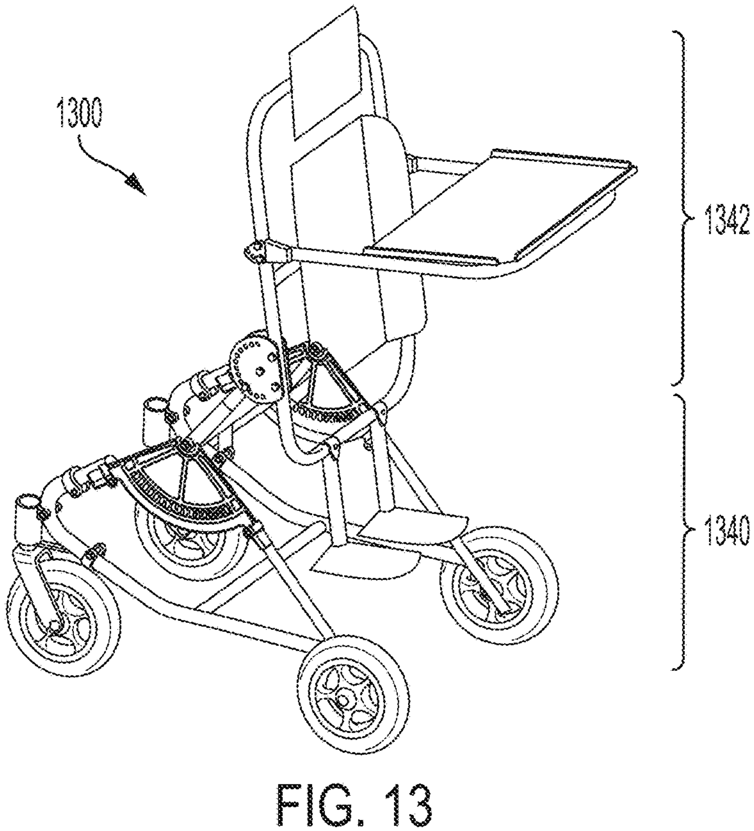
FIG. 13 shows a standing aid mobility system, according to some embodiments.

FIG. 13 shows a standing support mobility system 1300 according to some embodiments. As shown, standing support mobility system 1300 includes mobility base 1340 and standing aid module 1342.

Mobility Base with Multiple Wheel Configurations

Figure 14:
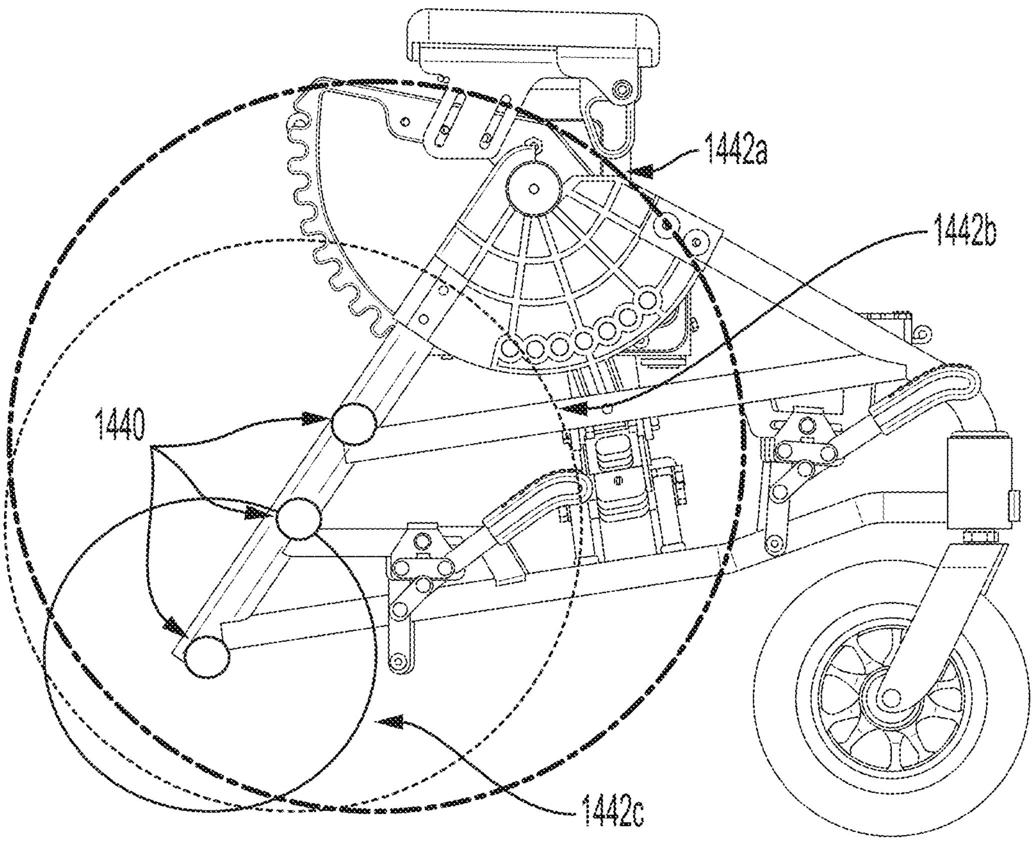
FIG. 14 shows a mobility base having multiple wheel configurations, according to some embodiments.

FIG. 14 shows an example of mobility base 1400 that is configured for different wheel options. In particular, mobility base comprises three different rear axle positions 1440. As shown, the three different rear wheel axle positions 1440 are configured for a big wheel option (1442*a*), a stroller wheel option (1442*b*), and a gait trainer/walker wheel option (1442*c*). In some embodiments, the big wheel option (1442*a*) may include a hand rim for use by the user. An optional hand rim would be within reach of the user, such that the user can grab and move the hand rim to propel the wheelchair. The stroller wheel option (1442*b*) can be configured with a wheelchair/stroller setup having three or four wheels. This wheel configuration is also ideal for children, since the wheels will be out of reach of the children. The gait trainer/walker wheel option (1442*c*) may be best for a gait trainer mobility system since it is the lightest weight. This adjustability can help configure mobility base 1400 for any of the various modules described in detail above.

The preceding description sets forth exemplary methods, parameters and the like. It should be recognized, however, that such description is not intended as a limitation on the scope of the present disclosure but is instead provided as a description of exemplary embodiments. The illustrative embodiments described above are not meant to be exhaustive or to limit the disclosure to the precise forms disclosed. Many modifications and variations are possible in view of the above teachings. The embodiments were chosen and described to best explain the principles of the disclosed techniques and their practical applications. Others skilled in the art are thereby enabled to best utilize the techniques, and various embodiments with various modifications as are suited to the particular use contemplated.

Although the disclosure and examples have been thoroughly described with reference to the accompanying figures, it is to be noted that various changes and modifications will become apparent to those skilled in the art. Such changes and modifications are to be understood as being included within the scope of the disclosure and examples as defined by the claims. In the preceding description of the disclosure and embodiments, reference is made to the accompanying drawings, in which are shown, by way of illustration, specific embodiments that can be practiced. It is to be understood that other embodiments and examples can be practiced, and changes can be made without departing from the scope of the present disclosure.

Although the preceding description uses terms first, second, etc. to describe various elements, these elements should not be limited by the terms. These terms are only used to distinguish one element from another.

Also, it is also to be understood that the singular forms “a,” “an,” and “the” used in the preceding description are intended to include the plural forms as well unless the context indicates otherwise. It is also to be understood that the term “and/or” as used herein refers to and encompasses any and all possible combinations of one or more of the associated listed items. It is further to be understood that the terms “includes, “including,” “comprises,” and/or “comprising,” when used herein, specify the presence of stated features, integers, steps, operations, elements, components, and/or units but do not preclude the presence or addition of one or more other features, integers, steps, operations, elements, components, units, and/or groups thereof.

The term “if” may be construed to mean “when” or “upon” or “in response to determining” or “in response to detecting,” depending on the context.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A modular mobility system comprising:

a mobility base comprising a plurality of rear wheel axle positions, wherein the mobility base comprises a first side frame connected to a second side frame such that a first opening is formed between a first front wheel of the first side frame and a second front wheel of the second side frame and a second opening is formed between a first rear wheel of the first side frame and a second rear wheel of the second side frame, the first and second openings separated by a cross bar connecting the first and second side frames of the mobility base, the cross bar separating the first front wheel and second front wheel from the first rear wheel and second rear wheel, and wherein the mobility base comprises a first interface plate located on the first side frame above the cross bar, the first interface plate comprising a guide rail extending inwardly from a first side of the interface plate toward a second interface plate located on the second side frame above the cross bar and extending along a curved edge of the first interface plate from a first straight edge of the first interface plate to a second straight edge of the first interface plate, and wherein an interior surface of the first interface plate is configured to receive and release a pin at any one of a plurality of angles between the first edge of the first interface plate and the second edge of the first interface plate; and a gait trainer module removably coupled to the mobility base at the first and second interface plate, wherein a first rear wheel axle position of the plurality of rear wheel axle positions is configured to receive a first rear axis wheel, and a second rear wheel axle position of the plurality of rear wheel axle positions is configured to receive a second rear axis wheel, wherein the second rear axis wheel has a diameter larger than a diameter of a first rear axis wheel.

2. The modular mobility system of claim 1, wherein the first and second interface plates are configured to receive the gait trainer at any one of a plurality of angles.

3. The modular mobility system of claim 1, wherein the gait trainer module comprises a telescoping tubular support configured to adjust for a height of a user.

4. The modular mobility system of claim 1, wherein the gait trainer module comprises a handle bar configured to adjust forward and backward.

5. The modular mobility system of claim 1, wherein the gait trainer module comprises a harness configured to support a user in a standing position.

6. The modular mobility system of claim 1, wherein each rear wheel axle position comprises a quick release configured to decouple a coupled rear axle wheel from the mobility base.

7. The modular mobility system of claim 1, wherein the first opening provides access for a user to propel the system in a first direction, wherein the first direction comprises the rear wheel axle leading the front wheel axle, and the second opening provides access for a user to propel the system in a second direction, wherein the second direction comprises the front wheel axle leading the rear wheel axle.

8. The modular mobility system of claim 1, wherein the first side frame and the second side frame are connected by a folding mechanism that allows the mobility base to fold into a compact configuration.

9. The modular mobility system of claim 8, wherein the folding mechanism comprises an X-brace folding mechanism.

10. A modular mobility system comprising:

a mobility base comprising a plurality of rear wheel axle positions, wherein the mobility base comprises a first side frame connected to a second side frame such that a first opening is formed between a first front wheel of the first side frame and a second front wheel of the second side frame and a second opening is formed between a first rear wheel of the first side frame and a second rear wheel of the second side frame, the first and second openings separated by a cross bar connecting the first and second side frames of the mobility base, the cross bar separating the first front wheel and second front wheel from the first rear wheel and second rear wheel, and wherein the mobility base comprises a first interface plate located on the first side frame above the cross bar, the first interface plate comprising a guide rail extending inwardly from a first side of the interface plate toward a second interface plate located on the second side frame above the cross bar and extending along a curved edge of the first interface plate from a first straight edge of the first interface plate to a second straight edge of the first interface plate, and wherein an interior surface of the first interface plate is configured to receive and release a pin at any one of a plurality of angles between the first edge of the first interface plate and the second edge of the first interface plate; and a wheelchair module removably coupled to the mobility base at the first and second interface plate, wherein a first rear wheel axle position of the plurality of rear wheel axle positions is configured to receive a first rear axis wheel, and a second rear wheel axle position of the plurality of rear wheel axle positions is configured to receive a second rear axis wheel, wherein the second rear axis wheel has a diameter larger than a diameter of a first rear axis wheel.

11. The modular mobility system of claim 10, comprising a gait trainer module configured to removably couple to the mobility base.

12. The modular mobility system of claim 10, comprising a standing aid module configured to removably couple to the mobility base.

13. The modular mobility system of claim 10, wherein the first and second interface plates are configured to receive the wheelchair module at any one of a plurality of angles.

14. The modular mobility system of claim 10, wherein the wheelchair module comprises side plates along a seat to adjust to a user, wherein the side plates are adjustable toward and away from a centerline along an axis extending from a front end of the wheelchair module to a rear end of the wheelchair module.

15. The modular mobility system of claim 10, wherein the wheelchair module comprises side plates along a back support to adjust for a user, wherein the side plates are adjustable toward and away from a centerline along an axis extending from a front end of the wheelchair module to a rear end of the wheelchair module.

16. The modular mobility system of claim 10, wherein the wheelchair module comprises a handle bar configured to adjust for a height of a user.

17. The modular mobility system of claim 10, wherein the wheelchair module comprises an adjustable foot rest.

18. The modular mobility system of claim 17, wherein the adjustable foot rest is configured to adjust for a length of a user's legs.

19. The modular mobility system of claim 17, wherein the adjustable foot rest is configured to pivot at a point where a foot rest tubular support is coupled to a frame of the wheelchair module.

20. The modular mobility system of claim 10, wherein each rear wheel axle position comprises a quick release configured to decouple a coupled rear axle wheel from the mobility base.

21. A modular mobility system comprising:

a mobility base comprising a plurality of rear wheel axle positions, wherein the mobility base comprises a first side frame connected to a second side frame such that a first opening is formed between a first front wheel of the first side frame and a second front wheel of the second side frame and a second opening is formed between a first rear wheel of the first side frame and a second rear wheel of the second side frame, the first and second openings separated by a cross bar connecting the first and second side frames of the mobility base, the cross bar separating the first front wheel and second front wheel from the first rear wheel and second rear wheel, and wherein the mobility base comprises a first interface plate located on the first side frame above the cross bar, the first interface plate comprising a guide rail extending inwardly from a first side of the interface plate toward a second interface plate located on the second side frame above the cross bar and extending along a curved edge of the first interface plate from a first straight edge of the first interface plate to a second straight edge of the first interface plate, and wherein an interior surface of the first interface plate is configured to receive and release a pin at any one of a plurality of angles between the first edge of the first interface plate and the second edge of the first interface plate; and a standing aid module removably coupled to the mobility base at the first and second interface plate, wherein a first rear wheel axle position of the plurality of rear wheel axle positions is configured to receive a first rear axis wheel, and a second rear wheel axle position of the plurality of rear wheel axle positions is configured to receive a second rear axis wheel, wherein the second rear axis wheel has a diameter larger than a diameter of a first rear axis wheel.

22. The modular mobility system of claim 21, comprising a gait trainer module configured to removably couple to the mobility base.

23. The modular mobility system of claim 21, wherein the first and second interface plates are configured to receive the standing aid module at any one of a plurality of angles.

24. The modular mobility system of claim 21, wherein the standing aid module comprises a body support and a head rest coupled to a frame.

25. The modular mobility system of claim 21, wherein the standing aid module comprises a tray holder coupled to a frame, wherein the tray holder is configured to adjust telescopically away from and towards the frame, and wherein the tray holder is configured to pivot relative to a location at which the tray holder is coupled to the frame.

26. The modular mobility system of claim 25, comprising a tray removably coupled to the tray holder.

27. The modular mobility system of claim 21, wherein the standing aid module comprises an adjustable foot rest.

28. The modular mobility system of claim 27, wherein the adjustable foot rest is configured to adjust for a length of a user's legs.

29. The modular mobility system of claim 27, wherein the adjustable foot rest is configured to pivot at a point where a foot rest tubular support is coupled to a frame of the standing aid module.

30. The modular mobility system of claim 21, wherein each rear wheel axle position comprises a quick release configured to decouple a coupled rear axle wheel from the mobility base.

31. A modular mobility system comprising:

a mobility base configured to be removably coupled to any one of a plurality of interchangeable modules at a first interface plate and a second interface plate of the mobility base, wherein the mobility base comprises a first side frame connected to a second side frame such that a first opening is formed between a first front wheel of the first side frame and a second front wheel of the second side frame and a second opening is formed between a first rear wheel of the first side frame and a second rear wheel of the second side frame, the first and second openings separated by a cross bar connecting the first and second side frames of the mobility base, the cross bar separating the first front wheel and second front wheel from the first rear wheel and second rear wheel, and wherein first interface plate is configured above the cross bar on the first side frame and the second interface plate is configured above the cross bar on the second side frame, the first interface plate comprising a guide rail extending inwardly from a first side of the interface plate toward the second interface plate and extending along a curved edge of the first interface plate from a first straight edge of the first interface plate to a second straight edge of the first interface plate, and wherein an interior surface of the first interface plate is configured to receive and release a pin at any one of a plurality of angles between the first edge of the first interface plate and the second edge of the first interface plate, wherein a first interchangeable module of the plurality of interchangeable modules comprises a gait trainer module, a second interchangeable module of the plurality of interchangeable modules comprises a wheelchair module, and a third interchangeable module of the plurality of interchangeable modules comprises a standing aid module.

* * * * *